May 24, 1932.  E. H. LOCKWOOD  1,859,878
METHOD OF AND APPARATUS FOR MANUFACTURING CONCRETE PRODUCTS
Filed Dec. 29, 1926  8 Sheets-Sheet 4
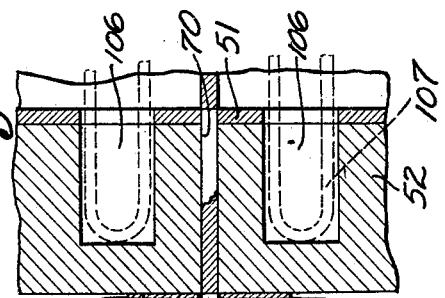
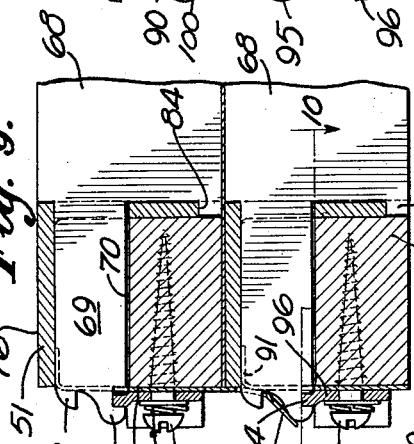
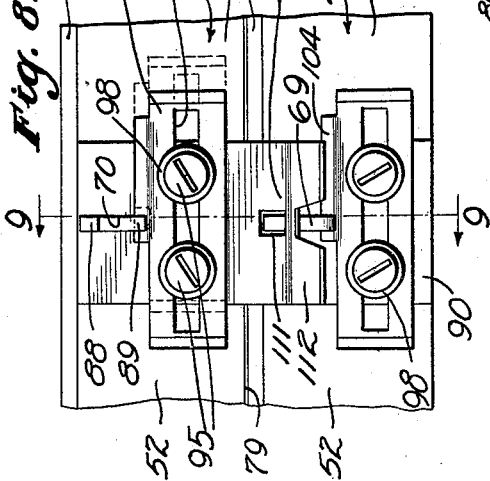
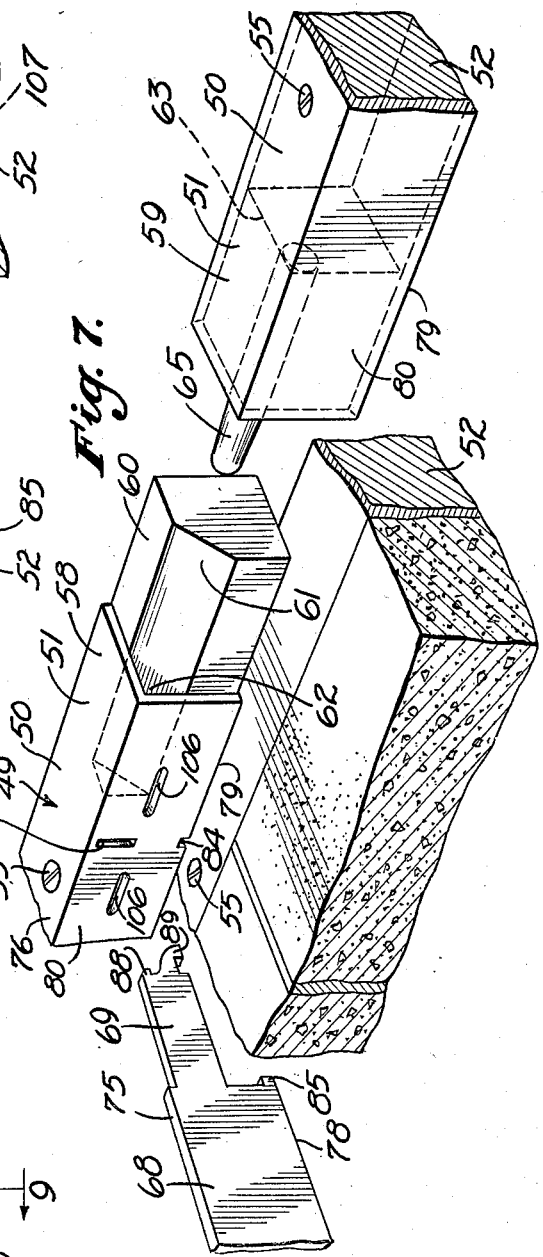
INVENTOR:
ERNEST H. LOCKWOOD
BY
ATTORNEY.

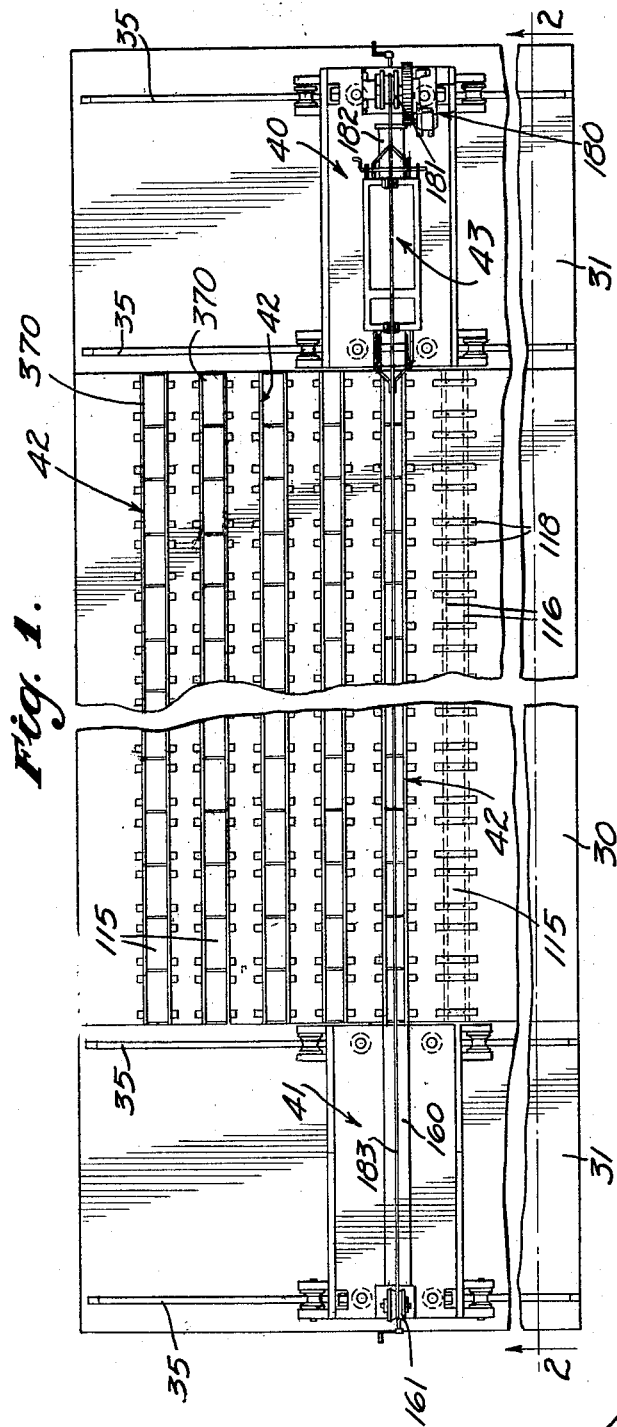
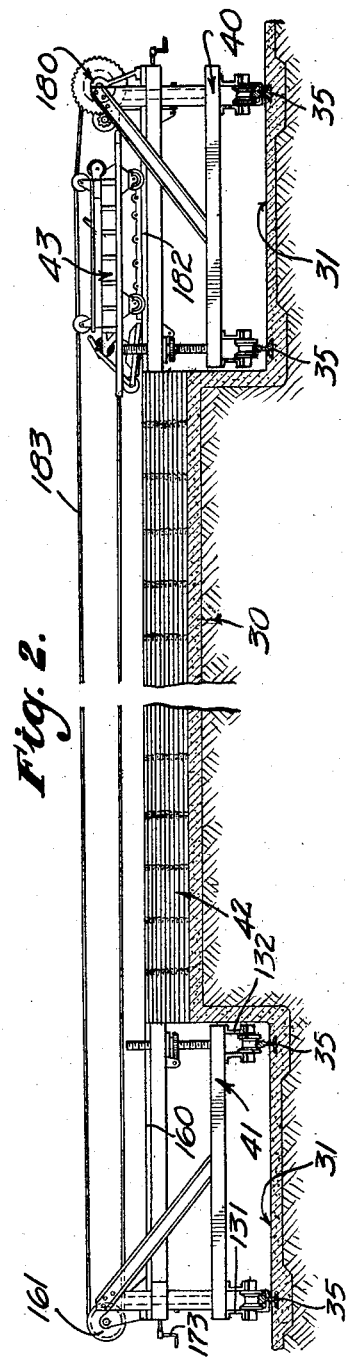

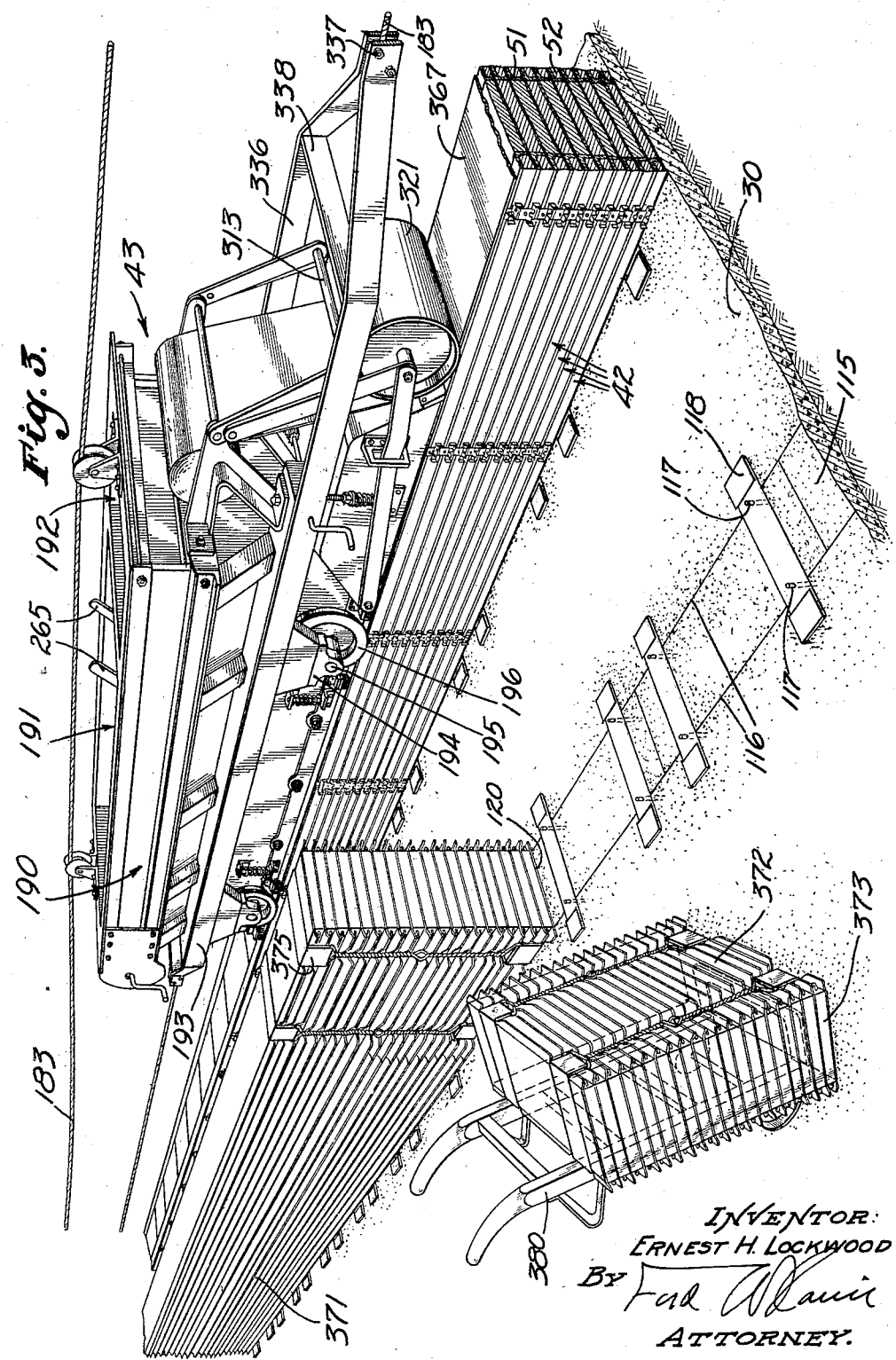

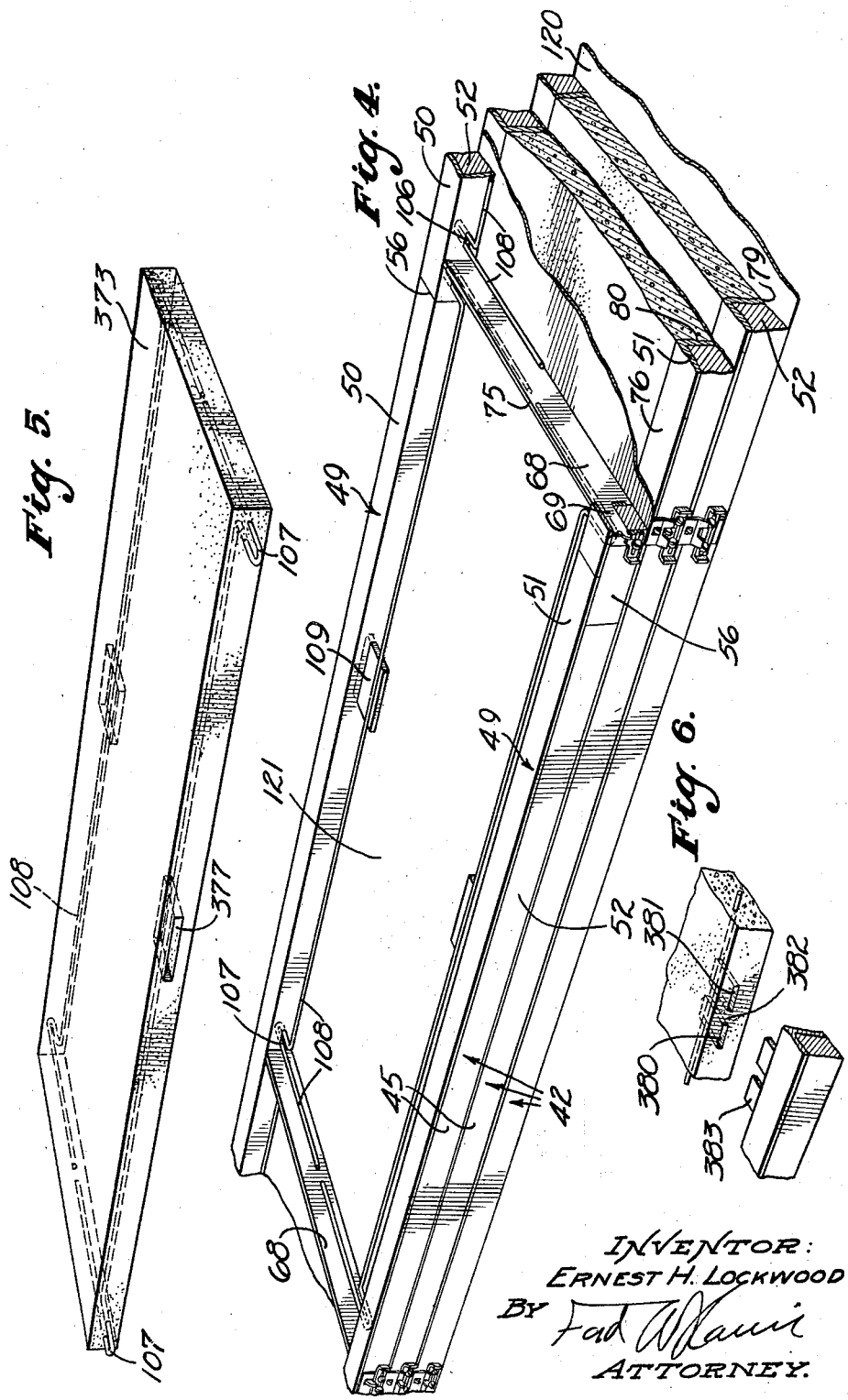

May 24, 1932. E. H. LOCKWOOD 1,859,878
METHOD OF AND APPARATUS FOR MANUFACTURING CONCRETE PRODUCTS
Filed Dec. 29, 1926 8 Sheets-Sheet 5
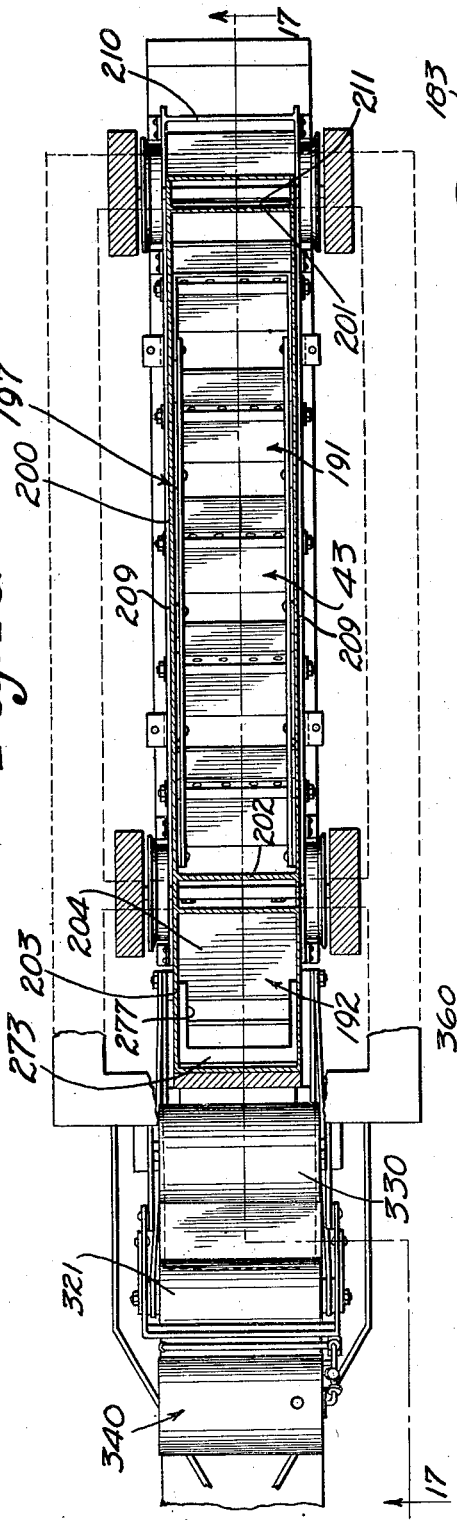
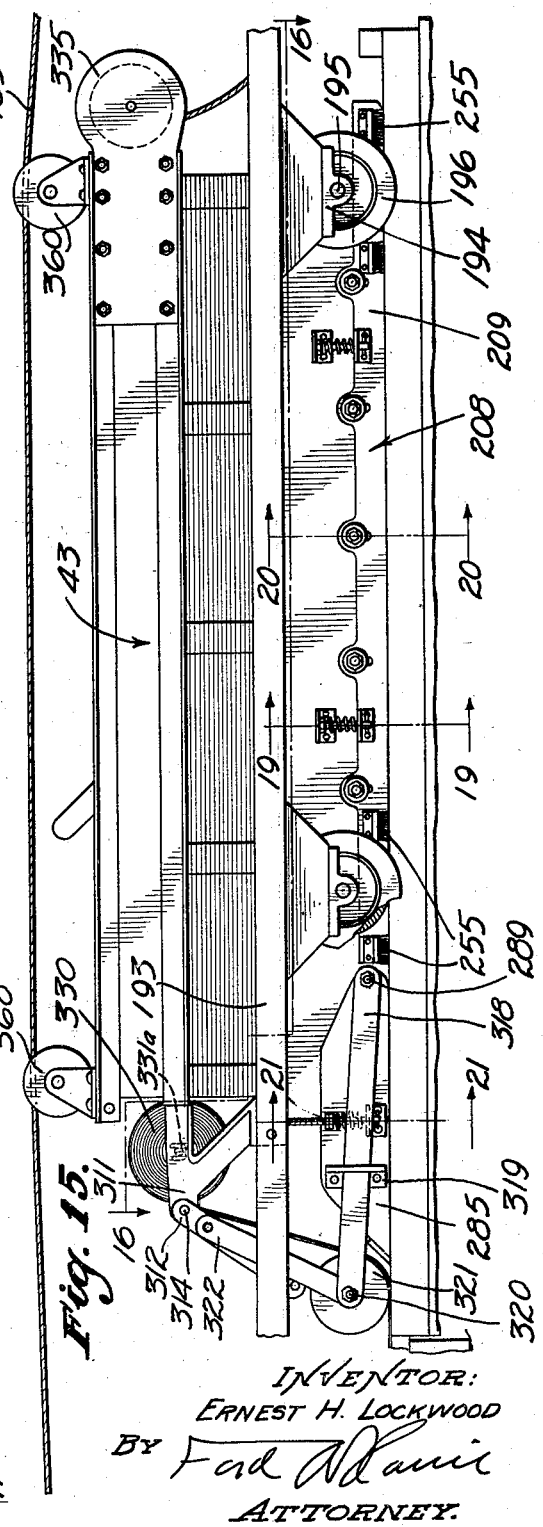
INVENTOR:
ERNEST H. LOCKWOOD
BY
ATTORNEY.

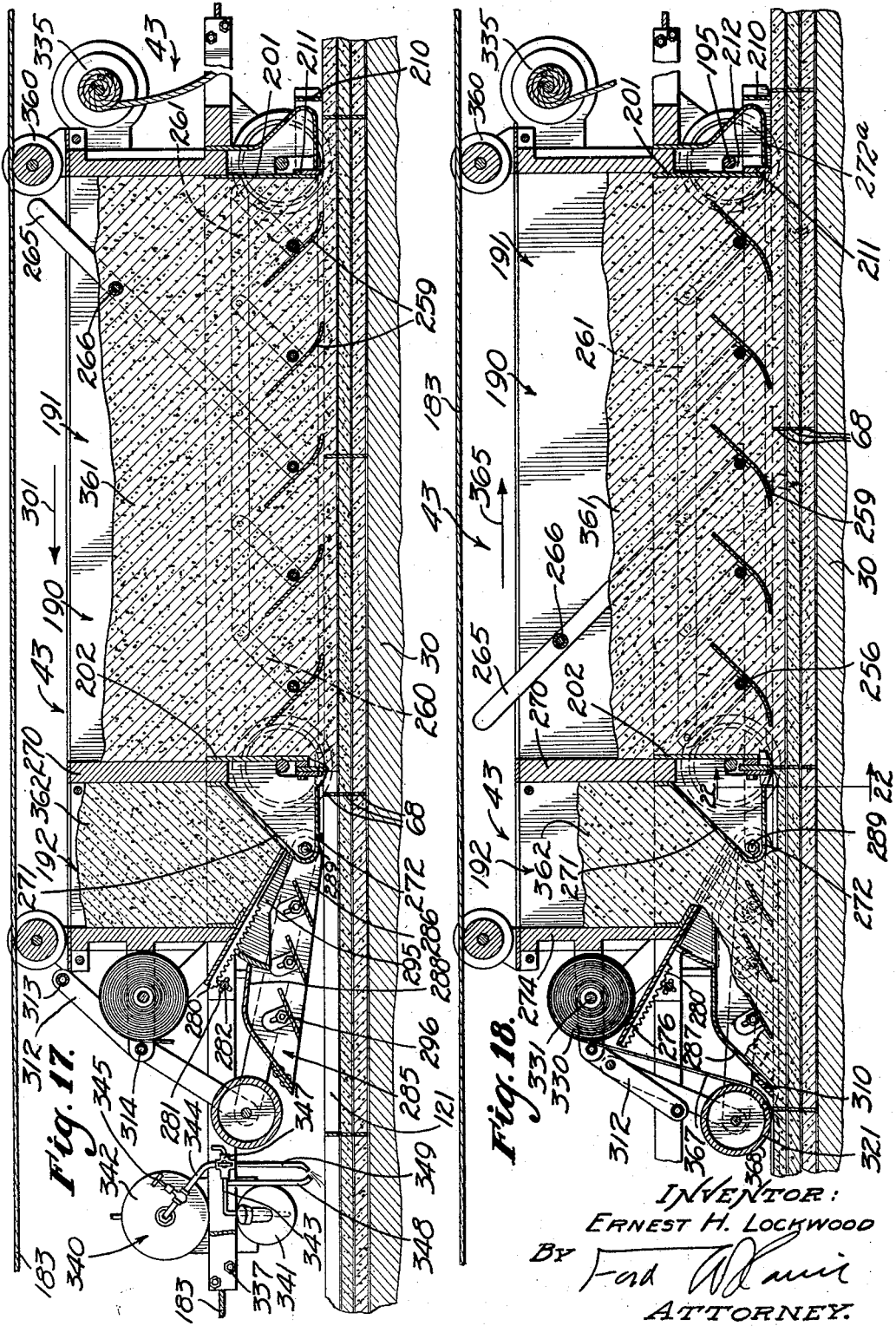

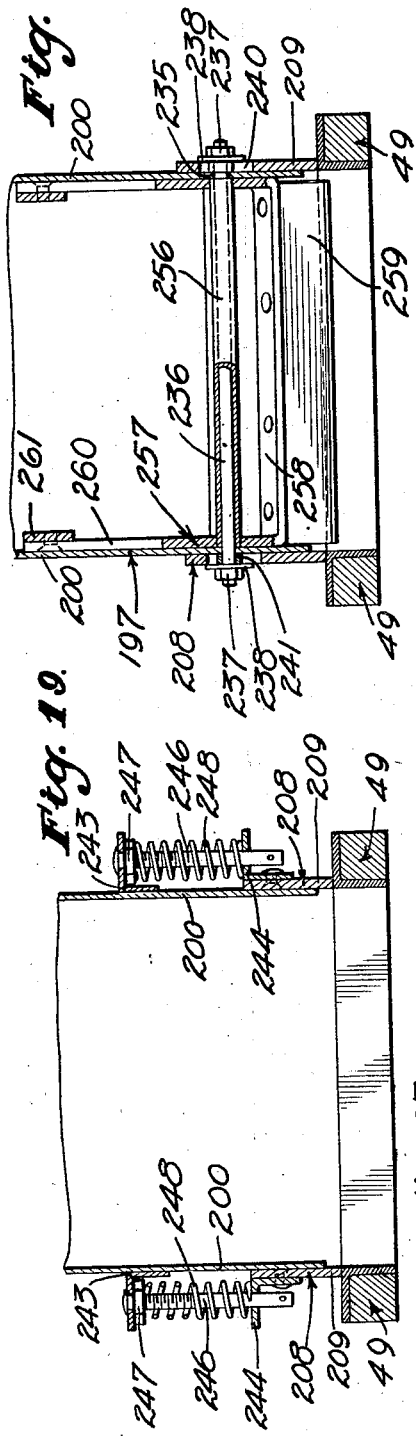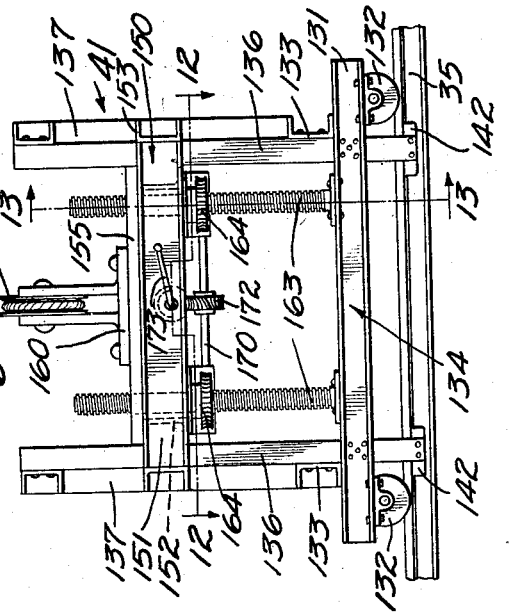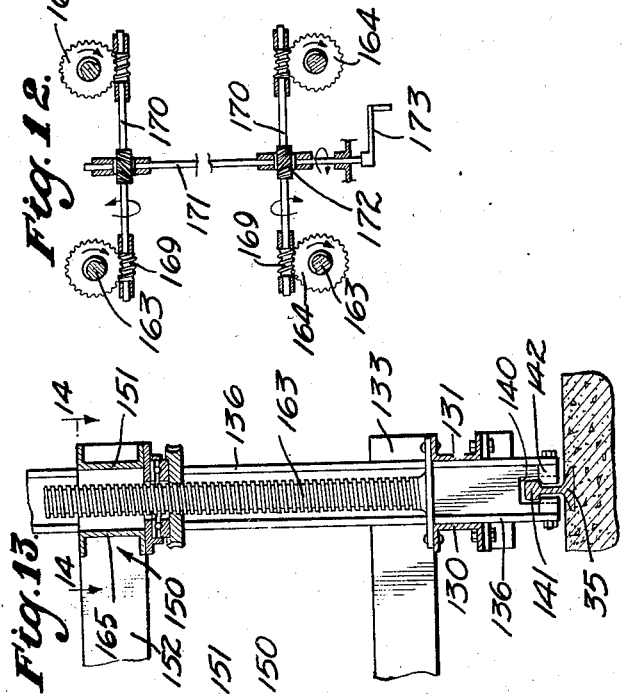

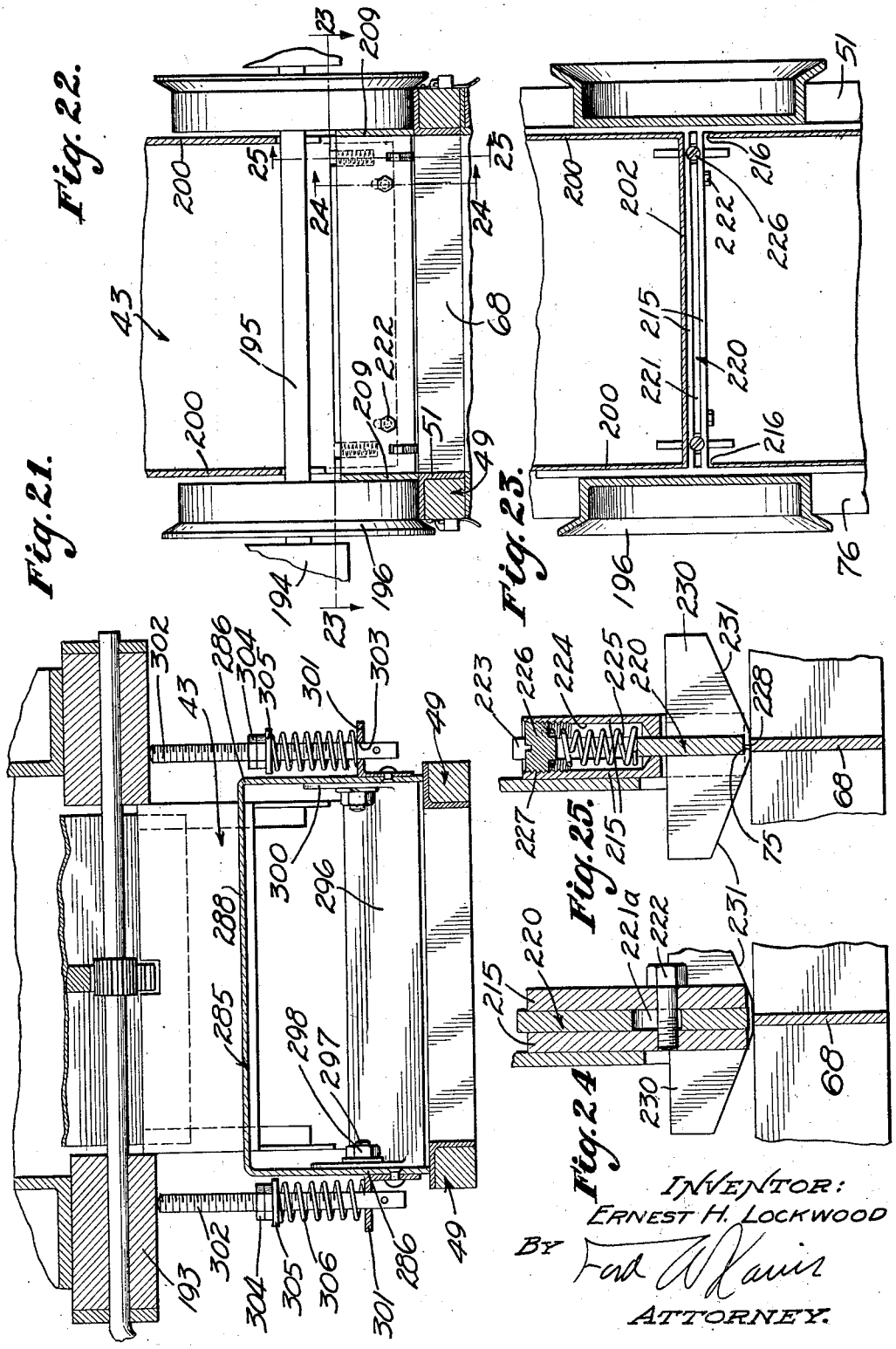

Patented May 24, 1932

1,859,878

UNITED STATES PATENT OFFICE

ERNEST H. LOCKWOOD, OF PASADENA, CALIFORNIA

METHOD OF AND APPARATUS FOR MANUFACTURING CONCRETE PRODUCTS

Application filed December 29, 1926. Serial No. 157,640.

This invention relates to the art of concrete construction and more particularly to the art of producing structures by utilizing precast concrete slabs which may be secured together and combined with concrete cast therein or therearound to form such structures.

It is an object of the invention to be hereinafter described to provide a concrete slab which is especially suited for use in various forms of building structure, this slab being provided with a novel form of reinforcement and with novel means for attaching it to adjacent slabs in said structure.

It is a further object of the invention to provide a process and apparatus by which such slabs can be economically produced in quantities and in which the slabs are produced in such a form that they can be transported economically, and with small likelihood of injury, to the point of consumption.

The slab required in the type of building construction described in my companion application, Serial No. 171,998, filed March 2, 1927, is a thin parallelopipedon having right angled edges and corners, this slab being particularly suited to the construction of rectangular structures. By a suitable modification of the apparatus employed, other forms of slab may be produced which may be suited for other purposes, but the annexed drawings and the following description will be directed especially to the form of slab above referred to without, however, limiting myself to this particular form beyond the scope of the annexed claims.

Concrete is formed of materials which, when mixed with water, form a plastic mass which can be cast in suitable molds and which, when so cast, "sets" or hardens. In setting, the concrete absorbs water of crystallization and to produce a concrete slab of maximum strength it is necessary that the concrete have available a sufficiency of water for proper settting and that it stand for a considerable period to allow it to set and harden.

Previous inventors have attempted to form precast slabs or blocks by casting the concrete in suitable molds in which it was allowed to stand for a sufficient period to properly set. When slabs are so cast in individual molds it is not only difficult to insure sufficient moisture to induce proper setting but the number of molds used is quite large and the space required for the storage of such molds and slabs is very large in proportion to the output, and the cost of handling such slabs and molds is also excessive.

It is a further object of my invention to provide means by which slabs may be cast and allowed to set under ideal conditions, as to ultimate strength, and by which large quantities of slabs may be produced with a small investment in molds and operating space.

Further objects and advantages will be made evident hereinafter.

In the drawings which are for illustrative purposes only:

Fig. 1 is a plan view of the apparatus of my invention.

Fig. 2 is a sectional view taken upon the line 2—2 of Fig. 1.

Fig. 3 is a perspective view of the molding car of my invention engaged in finishing a series of slabs in carrying out the method of my invention.

Fig. 4 is a perspective view of the track mold of my invention.

Fig. 5 is a perspective view of a slab such as may be manufactured in the mold illustrated in Fig. 4.

Fig. 6 is a view of a portion of a slab which might be produced by a modified mold, the modified portion of which is shown in this view.

Fig. 7 is a perspective view illustrating a joint in the longitudinal track members of the mold of my invention.

Fig. 8 is an elevational view of the latch and catch mechanism by which the molds of my invention are assembled.

Fig. 9 is a vertical sectional view taken on the line 9—9 of Fig. 8.

Fig. 10 is a horizontal sectional view taken on the line 10—10 of Fig. 9.

Fig. 11 is an end elevational view of the secondary traversing car of the apparatus of my invention.

Fig. 12 is a horizontal sectional view taken on line 12—12 of Fig. 11.

Fig. 13 is a vertical sectional view taken on the line 13—13 of Fig. 11.

Fig. 14 is a horizontal sectional view taken on the line 14—14 of Fig. 13.

Fig. 15 is a side elevational view of the molding car of the apparatus of my invention.

Fig. 16 is a horizontal sectional view taken on the line 16—16 of Fig. 15.

Fig. 17 is a longitudinal sectional view taken on the line 17—17 of Fig. 16, and showing the molding car travelling in a given direction.

Fig. 18 is a view similar to Fig. 17 and showing the molding car travelling in the opposite direction therefrom.

Figs. 19, 20 and 21 are vertical sectional views taken upon correspondingly numbered lines of Fig. 15.

Fig. 22 is a vertical sectional view taken upon the line 22—22 of Fig. 18.

Fig. 23 is a horizontal sectional view taken upon the line 23—23 of Fig. 22.

Figs. 24 and 25 are vertical sectional views taken upon planes indicated by the lines 24—24 and 25—25 of Fig. 22.

A slab such as is produced by my method is shown in Fig. 5. This slab is thin and provided with suitable reinforcing means as well as means by which it can be secured to other slabs or other adjacent structure.

One great advantage of my invention is that it enables slabs to be continuously and efficiently produced and cured without requiring large drying or curing yards and by the utilization of simple and efficient machinery.

This machinery need not be housed within a building although in cold climates this may be desirable. I have not therefore shown an enclosing building in the drawings.

*Brief description of operation*

The operations are preferably conducted on a smooth concrete molding floor 30 having depressed parallel pits 31 at either end thereof. A track formed of rails 35 is set in each of the pits 31. Traversing cars run upon these rails, these cars being duplicates of each other but for the sake of identification being hereinafter referred to as the primary traversing car 40 and the secondary traversing car 41. These cars may be moved along the rails 35 by any suitable means.

As shown in the plan view of Fig. 1, these cars are normally placed in line with each other at each end of the molding floor 30 and in this position serve a line of track molds 42, this line extending across the molding floor 30 from the car 40 to the car 41.

The track molds 42 are made up of members laid parallel with each other on each side of the center line of the cars 40 and 41, these members being joined and secured together by means to be hereinafter described.

The track molds 42 when so secured form a pair of parallel tracks upon which a molding car 43 travels, this car being pulled back and forth on the track molds 42 by a cable driven by means situated on the cars 40 and 41. The space between these parallel tracks forms a mold in which concrete is deposited from the car 43, this concrete being levelled off by means on the car parallel with the tops of the track molds 42 which have a depth equal to the thickness of the desired slab. When a course of concrete has been so laid the car 43 is run upon one of the cars 40 or 41 as shown in Fig. 2, and the upper portions of the cars 40 and 41 are then elevated through a distance equal to the thickness of one of the desired slabs.

The previously cast layer or course of concrete is then covered with paper or other separating material and another set of track molds is then put in place directly over those at the sides of the previously cast course. The operation is then repeated, a second course of slabs being laid and in turn covered with paper. It is not necessary to wait for one course to take its final set before casting another course upon it.

By repeatedly casting courses in this manner a wall is built up consisting of track molds on its outer faces with a core between the courses consisting of horizontal layers of concrete, each layer being separated from the layers below and above by a suitable separating material such as paper.

Each of these horizontal layers is divided into slabs by members which extend through the layer from side to side, these members being vertically in line with similar members in the horizontal layers above and below. This allows the slabs to be secured together in tiers or stacks and handled as a unit on a suitable truck as shown in Fig. 3. The slabs, having been cast in superimposed relationship, are mutually supporting, and a tier or stack suitably secured together as shown in Fig. 3 may be readily transported to place of use without danger of breakage.

*Construction of track molds*

The construction of the track molds 42 presents certain special problems and these molds will be described in detail.

As shown in Fig. 4 each track mold 42 includes a pair of track members 49. The track members 49 are made up in sections 50, each of which is substantially square in cross-section and is formed, as shown in the drawings, of an angle iron 51 which is supported by a wood backing member 52 which forms the outer and lower faces of the track members 49, the upper and inner faces upon which the car 43 runs and is guided being formed by the angle iron 51. The angle iron 51 is secured to the wood backing members 52 by suitable screws 55. Adjacent sections 50 the track members 49 are adapted to be joined together by joints 56 to form continuous track members 49 running the full length of the track molds 42.

Such a joint 56 is illustrated with the parts thereof positioned in readiness for assembly in Fig. 7. Each track section 50 has a male end 58 which is adapted to engage with a female end 59 of an adjacent track section. The wood backing member extends slightly beyond the end of the angle iron 51 in the male end 58 to form an engaging block 60 which is beveled at 61, the beveled portion 61 extending back in the angle iron 51 to provide a recess 62 between the wood backing member and the angle iron. The wood backing member 52 is cut off at 63 shorter than the end of the angle iron 51 at the female end 59 of a track section 50.

A metal dowel pin 65 is welded within the crotch between the adjacent flanges of the angle iron 51 where this projects beyond the end 63 of the wood backing member 52 in the female section end 59. This dowel pin 65 also projects beyond the end of the angle iron 51 so that when the female end 59 is moved over the male end 58, the dowel pin 65 enters the recess 62 and the block 60 enters the open end of the angle iron 51 of the female end 59. The adjacent sections of the track are thus held rigidly in alignment so that the upper and inner surfaces of the angle irons 51 of the two sections are continuous across the joint 56.

The sections 50 of the longitudinal track members are adapted to be assembled together so that the joints 56 occur opposite each other in opposite track members 49, as clearly shown in Fig. 4.

It is also to be noted that the joints 56 are disposed close to points of juncture between the track members 49 and tie plates 68 which tie these members together in spaced relation to form the trackmold 42 as shown in Figs. 4, 7, 8, 9 and 10. Any weakness which might be inherent in the joints 56 is thereby eliminated by the fact that the members 49 of one of the sections 50, immediately adjacent to the joints 56, are rigidly tied together by one of the tie plates 68. It is further made clear in Fig. 4 that the joints 56 between track sections 50 do not occur at corresponding points in adjacent track molds 42 when these are disposed one above the other.

The tie plates 68 each have a tongue 69 provided on each of its opposite ends, the tongues 69 being adapted to project through holes 70 which are formed through the track members 49. The holes 70 are spaced longitudinally throughout the length of the track members 49 so that the tie plates 68, which are of the same height as the track members 49, divide the space between the track members 49 in each track mold 42 into a consecutive series of slab molds of uniform length equal to the length of slab it is desired to produce.

In Figs. 8 to 10 inclusive, it will be noted that each tongue 69 is so formed upon its tie plate 68 that when it projects into the hole 70, the upper edge 75 of the tie plate 68 is flush with the upper face of the horizontal flange 76 of the angle iron 51. Also the lower edge 78 of the tie plate 68 is then flush with the lower edge 79 of the vertical flange 80 of the angle iron 51.

A notch 84 is formed in the flange 80 vertically below each hole 70. A lug 85 projects outwardly from each end of the tie plate 68 beneath the tongues 69. Each lug 85 is adapted to be inserted into one of the notches 84 to cooperate with the tongue 69 to maintain its tie plate 68 in vertical position.

Each hole 70 extends entirely through the track member 49. When inserted into this hole, the tongue 69 projects outwardly beyond the outer edge of the angle iron flange 76. The projecting ends of the tongues 69 are each provided with a nose 88 and a hook 89 therebeneath.

Wear plates 90 are formed of flexible metal. Each wear plate 90 has a notched inbent upper end 91 which is adapted to straddle the outer end of a hole 70.

Each wear plate 90 is suitably apertured to receive a pair of screws 95 which extend horizontally through the plate 90 into the wood backing member 52.

A latch 96 has a slot 97 through which the screws 95 pass, the slot being of such length as to permit a limited sliding movement of the latch 96.

Washers 98 are disposed upon the shanks of the screws 95 against the edges of the slot 97, and spring washers 100 are disposed between the washers 98 and the heads of the screws 95 so as to exert a slight yieldable pressure upon the washers 98, tending to hold the latch 96 against the wear plate 90.

A locking cam 104 is provided upon the upper edge of the latch 96 and is so formed that when the latch 96 is slid to the left as shown in Fig. 8, the cam 104 slides beneath the hook 89 and tends to exert a wedging action thereagainst, thus drawing the tongue 69 into the hole 70 so as to form an exceedingly snug connection between the tie plate 68 and the longitudinal track member 49.

On opposite sides of the inner end of the holes 70, mouths 106 are formed in the inner surface of the track members 49, as shown in Fig. 10. These mouths 106 are for the purpose of receiving tongues 107 formed by a return bend in a reinforcing wire 108 which is to be cast into the finished slab and which it is desired to hold in a fixed position within the track mold 42, these wires being shown in place in Figs. 4 and 5. The mouths 106 are formed with their major axial planes horizontally disposed equidistant from the upper and lower surfaces of the track members 49. In order that the tongues 107 of the reinforcing wires 108 may be uniformly positioned in all of the trackmolds 42, which is essential if the slabs to be produced therein may be readily assembled together, the mouths 106 are preferably die-formed so that these occur in exactly the same positions in each individual slab mold in each of the trackmolds 42.

In Fig. 10 the tongues 107 are shown in contracted position as these are being inserted into the mouths or apertures 106, the tongues 107, when released, expanding so that each reinforcing wire is rigidly secured in place by the contact of its tongues 107 with the opposite vertical edges of the apertures 106.

Core plates 109, as shown in Fig. 4, are suitably mounted in the inner surfaces of the track members 49 so as to project inwardly therefrom and be horizontally aligned with the mouths 106. The reinforcing wires 108 may be shaped as shown in Figs. 4 and 5 so that they are supported medially by the core plates 109 or they may have any other desired formation to provide a suitable reinforcing means for slabs which may be cast in the track molds 42.

As shown in Figs. 8 and 9, the wear plates 90 of the lowermost track mold 44 of the track molds 42 are cut off flush with the lower face of the track. Other track molds 45 of the track molds 42 are adapted to be assembled as just described and be superimposed successively on top of the lowermost mold 44 and on top of each other, the successive molds being secured together in the manner best shown in Figs. 8 and 9. The tie plates 68 which separate the finished blocks are disposed vertically above each other in the different courses.

In the construction of all of the track molds 45, the wear plate 90 instead of being cut off flush with the lower surface of the mold, extends downward to form a resilient catch 110 which has a hole 111 which is adapted to slip over and engage the nose 88 of the tie plate 68 disposed directly therebeneath. The wear plate 90 with which the catch 110 is integrally formed is rigidly held in fixed relation to the hole 70 over which it is placed and the hole 111 is formed so as to lie directly beneath the hole 70 over which the wear plate 90 is secured. Thus the catch 110 aligns the tie plate 68 of successive track molds 42 directly in vertical alignment with each other. The significance of this vertical alignment will be understood in the description which will follow.

Each catch 110 has outwardly inclined ears 112 which may be manually lifted for springing the catch 110 outwardly when it is desired to disengage a track mold 42 from the track mold immediately beneath it. It is to be noted that additional resiliency is given the catch 110 by virtue of the spring washers 100 being disposed between the heads and the washers 98 of the screws 95.

The track molds are laid in the following manner:

Referring specifically to Figs. 1 and 3, a series of parallel track lanes 115 are laid off on the molding floor 30 to be perpendicular to the pits 31 thereof. Just within the lines 116 marking the opposite edges of the lanes 115, track aligning pins 117 are set in the surface of the floor 30. Stack binding straps 118 are provided with suitable holes to fit over the aligning pins 117 so that they may be laid thereupon against the floor 30, as shown in Fig. 3, these straps being for a purpose to be described later.

A sheet of flexible material 120, preferably thin paper, is now unrolled over the lane 115 so that the aligning pins 117 puncture the paper and the paper lies down flat against the binding straps 118 and the surface of the floor 30. The binding straps 118 are formed of such thin material, this being preferably a light sheet metal, that they raise the paper only a small distance above the surface of the floor 30. A track mold 44 is now laid upon the sheet of paper 120 so that the pins 117 project upwardly just inside the track members 49 so as to position the track mold in accurate alignment upon each side of the lane 115. The pins 117 are so placed that the binding straps 118, when laid over these pins, will be disposed transversely of the lane 115, a pair of straps being positioned at opposite ends of each individual slab mold 121 which is formed in the track mold 44. The purpose of this disposition of the binding straps 118 will be made clear later. It will be seen that the pins 117 with the plates 68 determine the alignment and the gauge respectively of the initial track molds 44 in which the lowermost course of concrete is laid, and that the depth of the track molds determines the thickness of the slab produced. Also the plates 68 form the ends of the slabs, and the distance between the plates 68 determines the length of the slabs. It will be further evident when a horizontal course of these slabs has been formed that it can be covered with paper and another track mold can be set in place upon the first.

*The traversing cars*

The apparatus used to fill the track mold will now be described, first considering the traversing cars 40 and 41.

In these cars, as shown in Figs. 11, 12, etc., inner and outer pairs of under carriage channel irons 130 and 131 respectively are provided with wheels 132 which roll upon the tracks 35 and support the car 41. Longitudinal channel irons 133 extend across the upper faces of the pairs of channel irons 130 and 131, connecting these pairs of channel irons together and forming the base frame 134 of the car 41. Vertical channel irons 136 are disposed between the pair of channel irons 131 and rigidly secured thereto just inside of the wheels 132, as clearly shown in Fig. 11.

Brace channel irons 137 brace the upper ends of the channels 136 to the horizontal channels 133. The channels 136 extend downward from the pair of channels 131, the web of each of the channels 136 having an opening 140, as shown in Fig. 13, which opening is adapted to be disposed about the head 141 of the outermost of the rails 35.

Hold-down lugs 142 are provided upon the lower end of the vertical channels 136 are positioned beneath the head 141 of the outermost rail 35 to prevent the outer end of the traversing car 41 being lifted upward, the necessity of this precaution being made evident in the description which follows.

An elevating platform 150 is provided upon the car 41, the platform 150 having channel end members 151 and longitudinal channel members 152 which connect the channel members 151 and pass directly inside of the vertical channels 136.

A sliding bar 153 is built up at the juncture of the elevating platform channel members 151 and 152 to surround the vertical guide members 136 so that as the platform 150 is raised or lowered this movement will be maintained in a true vertical direction.

A floor of planking 155 is formed upon the top of the elevating platform 150, this floor supporting upon the center thereof a receiving platform 160 which has a flat upper surface and parallel edges which are separated the same distance as the outer edges of the track members 49 of the track molds 42.

A pulley 161 is provided with suitable mounting upon the outer end of the car receiving platform 160.

A mechanism for elevating the platform 150 consists of four threaded shafts 163 which are vertically disposed and mounted underneath the four corners of the platform 150 upon the pairs of channel irons 130 and 131. These shafts support the platform 150 through worm gear nuts 164 which are threadedly received on the shafts and which bear upwardly against plates which are secured upon the lower faces of end channel irons 151 and auxiliary channel irons 165 which are welded at their opposite ends to platform channel irons 152 in close spaced relation to the end channel irons 151. The nuts 164 are all maintained at the same level by the mechanism which is best illustrated in Fig. 12. The worm gear nuts 164 are driven in unison through four worms 169 secured in pairs upon the transverse shafts 170 which shafts are driven in opposite directions at the same speed by a longitudinal shaft 171 which engages with the shafts 170 through pairs of spiral gears 172. The shaft 171 may be manually rotated by a crank 173, thus rotating the worm gear nuts 164 in the same direction at a uniform rate of speed and causing the travelling platform 150 to be raised or lowered as desired. When the travelling platform 150 is lowered so as to rest upon the longitudinal channels 133, the upper face of the receiving platform 160 is on a level and contingent with one end of a track mold 42 which has been laid, as previously described, upon the molding floor 30 in a molding lane 115 opposite which the traversing car 41 is positioned.

The primary traversing car 40 is identical in construction with the secondary traversing car 41 with the exception that in place of the pulley 161, the primary traversing car 40 is provided with an electric winch 180 which has a drive pulley 181 which is centrally disposed upon the car 40 behind a receiving platform 182 thereof which is identical with the receiving platform 160. It will be evident that the cars 40 and 41 are not only capable of being moved along the rails 35 into a position in line with any of the track molds 42, but that the platforms of the cars can be adjusted vertically so that these platforms are in the same plane as the top of the track molds as each set is added to the wall so that the car 43 can be run off either end of the track mold 42 onto either car 40 or 41 and elevated therewith to lay the next higher course.

The molding car 43 is driven back and forth between the cars 40 and 41 by a cable 183 which is wound about and driven by the drive pulley 181, passing from this pulley across and above the track mold 42 and about the pulley 161, each end of the cable 183 being secured to the car 43.

By a suitable actuation of the electric winch 180, the car 43 may be pulled in either direction.

*The molding car*

The car 43 is designed to fill the track molds 42 with concrete and to accomplish certain other desirable results to be hereinafter defined. Its method of construction and operation will be now described.

Referring to Fig. 3 and Figs. 15 to 25 inclusive, the molding car 43 has a body 190 which provides a plastic concrete compartment 191 and a finishing material compartment 192. The body 190 has longitudinal side beams 193 upon the lower surface of which are mounted journal boxes 194 supported by axles 195 carrying flanged wheels 196. The wheels 196 are adapted to roll upon the horizontal flanges 76 of the angle irons 51 of the track members 49 to support the car 43 directly over one of the track molds 42. The body 190 is provided with a plastic concrete compartment mouth member 197 which is rectangular in shape and communicates at its upper end with the concrete compartment, the lower end of the mouth member 197 being disposed upon a horizontal plane slightly above the upper surface of the track mold 42 upon which the car is resting.

The mouth member 197 has side plates 200 and rear and front end plates 201 and 202 respectively. The side plates 200 extend forward beyond the front plate 202 to form side plates 203 of a mouth member 204 of the finishing material compartment 192, which will be described later. The side plates 200 of the mouth member 197 are so positioned upon the car body 190 that their outer surface is in vertical alignment with the inner face of the track members 49 of a track mold 42 when the car 43 is supported thereupon.

A telescopic member 208 has side bars 209 which slide upon the outer surface of the mouth member plates 200 and whose lower edges form a tight sliding fit with the upper surface of the track members 49 as best shown in Fig. 19.

A rear spacer bar 210 connects the rear ends of the bars 209 as shown in Fig. 16. A rear strike-off bar 211 connects the rear ends of the bars 209 and is slidably disposed in vertical axle slots 212 formed in the rear ends of the mouth member side plates 200 to receive the rearmost axle 195 upwardly therein. The rear strike-off bar 211 fits in tight sliding engagement with the rear face of the rear mouth member plate 201. The lower edge of the strike-off bar 211 is disposed on the same level as the lower edge of the side bars 209 of the telescopic member 208. A pair of forward spacer bars 215, which are best illustrated in Figs. 22 to 25 inclusive, connect the forward ends of the side bars 209 and are adapted to slide vertically in slots 216 formed in the side plates 200 to receive the front axle 195 therein. The rearmost of the bars 215 maintains a vertical sliding fit with the forward face of the plate 202.

A sub-surface strike-off member 220 is adapted to be slidably disposed in the space 221 between the forward spacer bars 215. The strike-off member 220 is provided with vertical slots 221a at the opposite ends thereof. Cap screws 222 are inserted through suitable apertures in the spacer bars 215 so as to be disposed in the slots 221a and to permit the strike-off bar 220 a limited vertical movement and giving it an extreme downward position in which the lower edge is disposed beneath the upper surface of the track mold 42. Slots 223 are formed downwardly in the upper edge of the strike-off member 220 at its opposite ends. Bores 224 are formed downwardly in the opposed faces of the spacer bars 215 so as to lie within the area of the slots 223.

Compression springs 225 are placed in the bores 224 and threaded plugs 226 are received in the upper threaded ends 227 of the bores 224 so as to bear downwardly against the springs 225 and cause the strike-off member 220 to be yieldably urged into its downward position. Thus, while the car 43 is rolling upon a track mold 42 the sub-surface strike-off member 220 is normally disposed so that its lower edge 228 is positioned beneath the level of the upper surface of the track mold. It is desired that the strike-off member 220 be raised at the ends of the individual slab molds 121, however, so that its lower edge 228 will pass over the tie plates 68. The strike-off member 220, therefore, is provided with a pair of cam members 230 having lower cam faces 231 which are adapted to engage the upper edge 75 of each tie plate 68 so the strike-off member 220 will be raised against the pressure of the springs 225 and permit the strike-off member 220 to pass over the top of the tie plate 68, as clearly illustrated in Figs. 24 and 25. It is obvious that by tightening cap screws 222 sub-strikeoff member 220 may be held upwardly in a position in which it will strike off material level with the top of the mold.

The telescopic member 208 is secured to the lower end of the hopper mouth member 197 for a limited sliding movement thereupon in the following manner. At various intervals along the lower portion of the side plates 200, opposite pairs of holes 235 are formed to receive rods 236 which are threaded on their opposite ends to receive nuts 237 and washers 238. The outer end portions of the rods 236 project outward through vertical slots 240 formed in the side bars 209 of the telescopic member 208. The washers 238 are spaced from the outer surface of the side plates 200 by spacer tubes 241 which are disposed in the slots 240 so that when the nuts 237 are tightened down the washers 238 bear upon the outer surface of the side bars 209 to permit the telescopic member 208 freedom for vertical sliding movement upon the hopper mouth member 197. Angle brackets 243 are provided upon the outer surface of the side plates 200 and directly beneath the brackets 243, angle brackets 244 are secured upon the bars 209. The upper end of a threaded bolt 246 is rigidly secured to the bracket 243 and carries a nut 247 thereupon directly below the bracket 243. The lower end of the stem of the bolt 246 projects through a suitable hole provided in the bracket 244 and a compression spring 248 is disposed about the stem of the bolt 246 to bear at its opposite ends upon the nut 247 and the bracket 244. Thus an adjustable pressure is exerted downward between the nut 247 and the bracket 244 tending to hold the telescopic member 208 in tight, yieldable engagement with the upper face of the tracks 49.

Brushes 255 are secured by brackets upon the outer surface of the side bars 209 upon opposite sides of each wheel 195. The brushes 255 bear against the upper surface of the track members 49 so as to remove any matter upon this surface in advance of the wheels 195 as they pass over this surface.

Spacer tubes 256 are disposed about the portion of the rods 236 inside of the mouth member 197, opposite ends of the spacer tube 256 abutting against the inner faces of the side plates 200. The end portions of the spacer tubes 256 pivotally support U-shaped trowel frames 257 which have horizontal trowel attaching portions 258, to which flexible trowel plates 259 are riveted, and which have upstanding arms 260 which are disposed in parallelism and are connected by pitman bars 261. In the embodiment shown, there are five of these trowels with the necessary associated structure which are adapted to be disposed in either one of two angular positions in which they are shown in Figs. 17 and 18 or in any position in between these extreme positions. This change in positions is effected by handles 265 which are formed by the elongation of the center trowel frame arms 260. These handles 265 are joined by a spacer member 266 for the purpose of uniting them. The handles 265 can thus be manually swung from the position in which they are shown in Fig. 17 to that in which they are shown in Fig. 18, or vice versa, in order to change the angular disposition of the trowel plates 259. The purpose of this change in angle of the trowel plates 259 will be described later.

The compartments 191 and 192 are divided by a wall 270. An inclined wall 271 is formed of metal and projects forward from the lower end of the wall 270 and is bent rearward at its lower end to form a horizontal wall 272, the piece of metal forming these walls 271 and 272 being welded at opposite edges to the forward extending portions 203 of the side plates 200 to complete the mouth member 204 of the finishing material compartment 192.

At the opposite end of the car 43 a similar horizontal wall 272a is provided adjacent the rear strike-off bar 211. The drawings show wall 272a somewhat diagrammatically in its relation to the molds. This wall is provided solely for the purpose of preventing upheaval of the plastic molding material. It is to be understood that the length of the wall 272a as well as the distance it is positioned above the upper level of the mold 42 on which the car 43 is travelling may be varied to accommodate material of greater or less fluidity.

An inclined guideway 273 is formed between a forward wall 274 of the compartment 192 and the lower end of the inclined wall 271. An inclined gate 276 is adapted to be slid rearward through the guideway 273 to close the opening 277, enclosed within the guideway, and effectively retain the material in the compartment 192 from being discharged downward therefrom.

The gate 276 is provided with a short rack 280 which is enmeshed with a pinion gear 281 formed upon a shaft 282 which is suitably journaled in the side beams 193 and provided with a handle so that the gate 276 may be manually controlled.

A finishing material spreading hood 285 has side walls 286 and an inclined forward wall 287 which is bent rearwardly to form an upper wall 288. The rear ends of the side walls 286 are pivoted by bolts 289 to the forward end of the forwardly extending side plates 203. The upper wall 288 has sliding engagement with an arcuate lip 295 of the mouth member 204. Fixed trowels 296 are rigidly but adjustably mounted in the interior of the spreading hood 285 by studs 297, provided upon the inner surface of the hood side walls 286 and receiving nuts 298 which tightly bear against upstanding ears 300 formed upon the trowels 296.

Brackets 301 are rigidly secured to the outside faces of the side walls 286. Threaded rods 302 are adapted to be disposed in holes 303 in the brackets 301 so that the rods 302 will be held in vertical position with their upper ends touching the car body side beams 193. Lock nuts 304, adjustably positioned upon the rods 302, bear downward against washers 305 so as to compress springs 306 between the washers 305 and the bracket 301. The springs 306 are thus caused to exert an adjustably yielding pressure downward upon the spreading hood 285.

The spreading hood 285, as shown in Figs. 17 and 18, has both raised and lowered positions. When in its lowered position the lower edge of the side walls 286 thereof makes a tight sliding engagement with the upper faces of the tracks 49, as shown in Fig. 21. The front inclined wall 287 of the spreading hood 285 is reinforced by a plate 310, the lower edge of which is upon the same level as that of the wall 287.

When the gate 276 is closed and the car 43 is travelling in the direction of the arrow 301, as shown in Fig. 17, the spreading hood 285 is adapted to be raised from contact with the upper face of the tracks 49 by a mechanism described as follows:

A pair of forwardly projecting brackets 311 are rigidly secured to the forward wall 274 and the side beams 193 of the car body 190. A pair of throw levers 312 joined at their outer ends by a bar 313 are pivoted at 314 upon the outer ends of the brackets 311. A pair of substantially horizontal arms 318 are pivoted at their rear ends to the bolts 289 outside of the rear ends of the spreading hood 285. These bars lie along the side of the hood 285 and pass through slots formed in brackets 319 provided upon the forward portion of the side walls 286 of the spreading hood 285. The forward ends of the bars 318 are secured to the outer ends of a shaft 320 upon which a surface finishing roller 321 is pivotally mounted.

Links 322 are pivotally secured upon the shaft 320 outside the roller 321, the upper ends of the links 322 being pivotally secured to the arms 312 a short distance from the pivots 314 thereof. Thus when the arms 312 are swung upward to a position as shown in Fig. 17, the spreading hood 285 and the surface finishing roller 321 are raised from the tracks 49 as shown. A roll 330 of flexible material, preferably paper, is mounted upon a shaft 331 which rests in journals 331a which are provided upon the interior faces of the brackets 311, as shown in Fig. 15.

A reel 335 is provided upon the rear end of the car body 190 for taking up the excess amount of the cable 183 in case it is desired to use a longer piece of cable than necessary for a factory plan of given proportions, as shown in Fig. 1.

Longitudinal draft bars 336 are rigidly secured upon the outer faces of the beams 193, the bars 336 being inclined together at opposite ends, which ends are clamped together by bolts 337 to secure an end of the cable 183 thereto. The bars 336 at the forward end of the car 43 are spaced by a spacer bar 338 which is welded to the bars 336.

It is one of the features of my invention to provide an apparatus for oiling the tracks 49 in advance of the trip of the car 43 thereover in the direction indicated by the arrow 301 in Fig. 17. An oil spray apparatus 340 is shown mounted upon the forward ends of the draft bars 336 in Figs. 16 and 17. This apparatus includes an oil tank 341, an air tank 342, an oil supply pipe 343, and an air supply pipe 344 controlled by a valve 345, a four-way valve 347 and an oil spray pipe 348 and an air spray pipe 349. The operation of the oil spray device 340 is as follows:

The set of pipes described are disposed in duplicate at the opposite sides of the tanks 341 and 342, each set operating in the following manner:

When the four-way valve 347 is turned, as shown in Fig. 17, the valve 345 is slightly opened and a stream of air flows outward from the tank 342 through the valve 345, the pipe 344, the four-way valve 347, and the air spray pipe 349. The stream of air thus discharged moves across the mouth of the oil discharge pipe 348 to draw oil from the tank 341 and spray this upon one of the tracks 49 over which the ends of the pipe 348 and 349 are disposed. When it is desired to shut off the spray apparatus just described the four-way valve 347 is turned through an angle of 90° which will shut off the air supply and open the oil supply pipe 343 to the atmosphere, thus preventing an undesirable siphoning of the oil from the tank 341 through the oil nozzle 348.

Idler pulleys 360 are centrally mounted upon the top of the car body 190 to support that portion of the cable 183 which is disposed above the car.

Full description of operation

The operation of the apparatus of my invention is as follows:

The molding floor 30, as shown in Fig. 1, has a series of lanes 115 marked out thereon as previously described. In commencing the slab manufacturing operation, the car 43 is resting upon the receiving platform 182 of the traversing car 40. At this time the elevating platforms 150 of the traversing cars are in their lowermost positions. The traversing cars 40 and 41 are then rolled upon the tracks 35 so as to be positioned with the receiving platforms 160 and 182 in alignment with the first molding lane 115 at the opposite ends thereof. A lowermost track mold 44 having been laid upon the first lane 115, as previously described, the receiving platforms 160 and 182 will form a continuous track with the track mold 44 just laid down, so that the molding car 43 may smoothly travel from the platform 182 onto the track mold 44 and traversing its entire length, travel smoothly therefrom onto the receiving platform 160, and return in a similar manner. As previously described the upper faces of the receiving platforms 160 and 182 are flat and therefore when the molding car 43 rests upon either of these receiving platforms, the telescopic member 208 cooperates with the flat platform to make a substantially tight sliding seal of the lower end of the mouth member 197. A quantity of plastic concrete 361 is now poured into the hopper 190 without any leakage of this concrete from the bottom of the car 43. The lever arms 312 are thrown upward at this time, as shown in Fig. 17, so as to raise the spreading hood 285 and the slab surface finishing roller 321 out of contact with the receiving platform 182. The gate 276 is closed and a quantity of slab finishing material 362 is poured into the hopper 192. The hand levers 265 are at this time disposed rearward so that the flexible trowel plates 259 are inclined, as shown in Fig. 17. Also the oil container 341 is filled with oil, and air under pressure is pumped in the air tank 342, the four-way valve 347 being turned to prevent a spray of oil from the oiling apparatus 340.

The car 43 now being ready for travelling from the receiving platform 182 over the lowermost track mold 44 onto the receiving platform 160, the valve 347 is moved to spraying position and the electric winch 180 is set in motion so that the cement car 43 is moved in the direction of the arrow 301. As the telescopic member 208 is moved from contact with the receiving platform 182 over the open space of the track mold 44, the slab molding spaces 121 are filled with plastic "wet-mix" concrete flowing downward from the hopper 191. When the molding car is moving in this direction the sub-surface strike-off member 220 operates in the manner above described but without useful effect. The rear strike-off bar 211 of the telescopic member 208 strikes off the plastic concrete 361, which pours downward from the compartment 191 into the molds 121, upon the level of the upper face of the tracks 49. Where the molding material has a fairly fluid character the track mold 44 will be left completely filled with molding material after the car 43 has made one trip over this mold as above described. In the usual practice, however, the molding material is not sufficiently fluid to accomplish this and after the first trip of the car 43 over the mold 44, the end portions of each individual mold, which are first to be covered and uncovered by the car, are not filled full of material. Instead, shallow depressions appear in the upper surface of the material in these end portions of the individual molds and it is necessary to make a return trip of the car 43 over the mold 44 to completely fill the molds 44 with material. This return trip will be described in the remainder of the description of the operation.

During the travel of the car 43 over the mold 44 as above described the flexible trowel plates 259 exert a yieldable downward pressure causing their lower edges to be flexed, as shown in Fig. 17, thus tending to force the concrete 361 into the slab mold space 121. The operation of the power winch 180 is continued as started until the car 43 is entirely disposed upon the receiving platform 160 when the power winch 180 is stopped and the valve 347 is turned to non-spraying position.

The hand levers 265 are now swung to the position in which they are shown in Fig. 18 so as to reverse the inclination of the flexible trowels 259. The lever arms 312 are then swung downward so that the spreading hood 285 and the surface rollers 321 are allowed to rest upon the upper surface of the receiving platform 160. The gate 276 is run outwardly to its open position, as shown in Fig. 18, so as to permit the finishing material 362 to pour downward through the opening 277 into the spreading hood 285. The tight sliding fit of the spreading hood 285 upon the upper surface of the receiving platform 160 prevents the finishing material 362 from leaking out of the spreading hood. The loose end of the roll of paper 330 is then threaded underneath the slab surface roller 321, as shown in Fig. 18.

The power winch 180 is now started in the opposite direction from that by which the first travel of the car 43 over the track mold 44 was made. The car 43 is thereupon drawn by the cable 183 in the direction of the arrow 365, shown in Fig. 18, so as to return over the tracks 49 of the track mold 42 from the receiving platform 160 to the receiving platform 182. On the return passage of the car 43, the flexible trowel plates 259 exert a further pressure against the plastic concrete in the individual slab molds 121, thus insuring the penetration of the plastic concrete to all parts of these molds. The sub-surface strike-off member 220 performs its function upon this return trip, this function being to gauge off the concrete from the individual molds 121 down to a level 366, as shown in Fig. 18, which is slightly below the upper level of these molds. In the same movement of the car 43 the space in the molds 121 above the level 366 is then filled with finishing material 362 which is urged downward into this space by the rigid trowels 296. As the spreading hood 285 thus applies the finishing material 362, the edge 310 of the hood 285 strikes off the excess of finishing material down to the upper level of the mold 44. If desired the hood edge 310 may be formed so as to crown the finishing material above the upper level of the mold 44 so that this crown of material will have to be rolled down into the concrete already in the mold. Moreover, the finishing material may be of a dry porous nature such as gravel or sand and may be forced into the wet concrete body of the slab to cause it to adhere to the slab. A strip of paper 367 which unrolls from the roll 330 is so thin that it partakes of the shape of the outer surface 368 of the slab surfacing roller 321 which now presses the paper 367 onto the upper surface of the finishing material disposed in the upper portion of the molds, so that the finished face of the slabs thus formed in the individual slab molds 121 will partake of the nature of the surface 368. The paper 367 is of the same width as the track mold 44, as clearly shown in Fig. 3, and when the car 43 has returned to the receiving platform 182 and the movement of the power winch 180 has been halted, the sheet of paper 367 is left covering the filled track mold 44.

By the operation of the cranks 173, the elevated platforms 150 of the traversing cars are now raised a distance equal to the depth of a track mold 45 and an upper track mold 45 is placed over the lowermost track mold 44 so as to accurately register therewith and be secured thereto by the catches 110 as previously described. The car 43 is then run across the track mold 45 to the receiving platform 160 and back, thus filling this track mold in identically the same manner as above described for the lowermost track mold 44. In this manner as many as twenty track molds may be superimposed upon each other and filled successively so as to form a consecutive series of horizontal layers of cast slabs. The layers may be broken up into stacks. These stacks, as seen in Fig. 3, are formed by casting a plurality of courses of slabs, one upon the other, each successive course of slabs being cast upon the one next below it, preferably before the lower course is set. Thus the plastic material of each successive course of slabs flows into all the inequalities of the upper surface of the course of slabs immediately therebelow so that when the concrete of the slabs is set and the molds removed, a consecutive series of stacks of slabs will rest upon the molding floor 30 with the weight of all the slabs in each stack transferred to the slabs therebeneath in such a manner that no undue stresses are set up tending to fracture any of the slabs. Moreover, the surface formed upon the upper face of the slabs by the surfacing roller 321 will not be changed or marred in any way by the casting of a slab directly upon this surface. Instead of this, the finished surface of each course of slabs will be conserved by the conforming of the paper to this surface and the conforming of the material of the next higher course of slabs with all the inequalities of the paper.

When the first stack 370 of filled track molds 42 has been built up to the desired height the traversing cars 40 and 41 are moved opposite the next casting lane 115 and a new stack 370 is built up in the same manner as the first. It has been found that it is necessary to provide track molds 42 for only three or four complete stacks 370 because by the time this number of stacks has been completed, the plastic concrete of the slabs cast in the first stack 370 has set sufficiently to permit the track molds 42 to be removed therefrom and used in forming the next new stack 370. Thus, with this limited number of molds, a series of stacks of slabs may be cast to cover each of the casting lanes 115 throughout the length of the casting floor 30 which may cover any desired distance. When the track molds 42 are removed, a consecutive series 371 of stacks 372 of slabs 373 remain resting upon each of the lanes 115, as clearly shown in Fig. 3.

As previously mentioned, one of the outstanding features of this invention is the efficiency and economy with which the slabs may be cured while thus standing in stacks upon the casting floor 30. Because the slabs in each stack fit into each other so that air is excluded from the entire stack, much as if it were a solid mass of concrete, water is lost from the stack only by evaporation from the uppermost surface thereof. Also when the track molds 42 are removed from the stack, the edges of the layers of paper 367 project outward to shade the exposed side surfaces of the stack so that evaporation from these surfaces is comparatively small. In fact, it is unnecessary to apply water to the stacks of slabs, as more than sufficient water is retained in each stack of slabs, after the casting thereof, for the complete and proper curing of the slabs therein.

The stacks of slabs remain upon the casting floor until cured and, thereafter, in storage until sold for building purposes. It is desired for purposes of economy in handling the slabs, and to prevent breakage in handling, to handle and transport the stacks 372 as units. To this end binding straps 375, identical to the lower binding straps 118, are placed across the top of the stacks 372 and opposite the straps 118, and the respective ends of the straps 375 and the straps 118 are bent toward each other, as shown in Fig. 3, and joined by twisted wire so as to rigidly bind each stack of slabs 372 together for transportation. By the use of a truck 376, as shown in Fig. 3, these stacks 372 may be handled upon the casting floor 30 with great facility and economy.

The slab 373, as shown in Fig. 5, is reinforced by the reinforcing wires 108 from which the tongues 107 extend outwardly from the edges of the slab at its opposite ends, the tongues 107 being aligned on the interfacial plane of the slab 373 with the holes 377 which are formed by the cores 109 in the central portion of the opposite longitudinal edges of the slab. The purpose of this relationship between the tongues 107 and the holes 377 is explained in detail in my above referred to co-pending application upon a "building construction", Serial No. 171,998, filed March 2, 1927. It may sometimes be desirable for each of the holes 377 to be formed in two holes 380 and 381, as shown in Fig. 6. Thus a web 382 of material which is disposed between the holes 380 and 381 reinforces the longitudinal edge of the slab 373. In order to form the holes 380 and 381 a bifurcated core 383 is provided upon the inner surface of the track members 49 in the place of the unitary cores 109.

Referring to the operation of the molding car of my invention it is desired to stress the importance of the feature of this car rolling or sliding upon tracks which form a continuous mold and with which a plastic material compartment of the car is maintained in substantially tight communication so that the fluid head of the plastic material forces this material into the various portions of the mold. Cooperating with this combination are the many other features of the invention.

While the car 43 is shown as provided with wheels, this is not essential to the successful performance of its function. It is therefore desired that the term "car", as used in the claims, shall be taken to refer to any kind of vehicle capable of moving upon the track molds 42 so as to distribute any kind of plastic material therein.

*Results produced*

It will be evident that while I have shown an embodiment of my invention adapted to produce building slabs, it is adapted to the production of other cement or concrete products such as tile, silo staves, ashlaring, wall facings, brick or the like, it being evident that any plastic material suitable for molding which will harden after being molded may be used in the manufacture of these products by the method of my invention.

It has a peculiar utility in that it enables me to produce a slab which is of uniform composition throughout or which preferably consists of a main body of one material such as strong wet mix concrete and a surface layer of different material and having a different texture, color, or surface adhesion.

It has a further utility in that it allows me to incorporate in the slabs suitable reinforcement, the ends of which project from the slab and form a part of the means used to lock the slabs together.

The process and apparatus described produces certain new and useful results. It makes possible the production of thin slabs in stacks in which the individual slabs are of accurately similar dimensions and fit closely against each other at their upper and lower surfaces so that they mutually support and strengthen each other. Each of these stacks may thus be handled as a unit without danger of breaking the thin individual slabs.

By casting the slabs in horizontal layers in a wall it is not necessary to wait until one layer sets before casting a succeeding layer and the production of horizontal layers continues until the wall is built up to the desired height. The concrete in the wall starts to set as soon as it is deposited therein, and this setting is accomplished under very favorable conditions since evaporation therefrom is very slow and the water initially in the mix is substantially all available to supply the water of crystallization so necessary to strong concrete.

The use of the peculiar form of track mold described enables me to not only provide for the formation of horizontal layers of uniform thickness but also to divide these layers into slabs of uniform length, the tie plates 68 being in effect cast in the wall and tying the track molds and concrete core together so that a wall of considerable height can be built up. It is to be noted that the weight of the car 43 is at all times taken entirely by the track molds 42 so that no stresses are imposed upon the previously cast concrete prior to its final setting.

The use of paper between the horizontal layers of the wall also has important advantages since the paper is quite inexpensive and, being thin and flexible, does not prevent the different slabs from being mutually self-supporting in the stack but does effectually separate the slabs so that they can be readily detached from each other when it is desired to incorporate them in a structure.

By my invention it is possible to produce slabs of maximum strength and uniform dimensions at an extremely low cost and in a form that permits of ready transportation without danger of breakage.

I claim as my invention:

1. In a plant of the character described, the combination of: a molding floor; depressed tracks upon opposite sides of said floor; trackmolds, vertically open, adapted for alignment in successive superimposed courses across said floor from one depressed track to the other each course together with elevators disposed at each end thereof being adapted to serve as a continuous track for a molding car; elevators on wheels adapted to run on said depressed tracks, respectively, and to raise or lower or laterally move said molding car, and to connect and serve with each course of molds as said track for said molding car; a wheeled molding car adapted to run upon said track, propelled by means of a cable supported and actuated by mechanism upon said elevators or their structures.

2. In apparatus for molding slabs, ashlaring, tile, wall facings and like products of concrete or other suitable plastic material, the combination of: a molding car and a track therefor, said track comprising "closed end sections" and an intermediate "open mold section"; said car comprising a body on wheels; a material hopper, horizontal plates extending front and rear adapted to just clear said molds and prevent upheaval of material; and a telescopic downwardly urged extension of said hopper slidably connected thereto adapted to maintain a close sliding fit with said track; said hopper being downwardly open but closed by contact with said "closed end sections"; material there charged into said hopper being adapted during car movement to settle into and to fill said molds under predetermined fluid head pressure, substantially without loss of material or of compression, surplus material being stricken off and retained within said car by means provided therefor.

3. In an apparatus for the manufacture of concrete products, the combination of: a mold having longitudinal members providing a pair of tracks; a car adapted to travel upon said tracks for filling said mold with molding material; and means provided upon said car for striking off an excess of said material delivered to said mold and returning it into said car.

4. In an apparatus for the manufacture of concrete products, the combination of: a mold having longitudinal members providing a pair of tracks; a car adapted to travel upon said tracks, a molding-material container being provided upon said car; means fitting said mold to connect said container with said mold as said car travels upon said tracks whereby said mold is filled with material; and means for striking off the excess material so that said excess is retained in said container.

5. In an apparatus for the manufacture of concrete products, the combination of: a mold having longitudinal members providing a pair of tracks; a car adapted to travel upon said tracks, a molding-material container being provided upon said car; and means fitting said mold to connect said container with said mold as said car travels upon said tracks whereby the head of pressure of material in said container is transmitted through said material to the interior surface of said mold.

6. In combination; a course of stationary molds; a sliding, material delivering mouth member with which said course of molds is adapted so as to maintain a non-leaking relationship therebetween; a molding material container moving in non-leaking connection with said mouth member and discharging material under pressure through said mouth member into said molds; means provided for applying pressure in addition to existent superimposed weight of said material, said pressure being conveyed into said molds through said material.

7. In apparatus for molding slabs, ashlaring, tile, wall facings and other suitable products, the combination of: stationary molds and moving mold-charging means adapted in cooperation to receive, confine and mold concrete or other plastic material under confined pressure into said products, substantially without waste of material.

8. An apparatus for casting concrete slabs comprising: molds for forming said slabs in successive superimposed horizontal layers; a car adapted to be supported by and to move on said molds and to distribute concrete therein; and means for bringing said car and the mold for each of said layers into the proper vertical relationship to permit said car to perform its function, as stated.

9. In apparatus for molding slabs, ashlaring, tile, wall facings and like products of concrete or other suitable plastic material, the combination of: molds adapted to be aligned in superimposed courses, each course being adaptable as a track for a molding car; a molding car adapted to run upon each of said courses and to discharge molding material therein; and means for raising or lowering said car as part of said operation.

10. In an apparatus for the molding of slabs and the like, the combination of: molds adapted for assemblage in superimposed courses; a molding car adapted to fill said molds with molding material when moving in communication therewith; and an elevator adapted to raise, lower or laterally move said molding car in order to communicate with other courses of molds.

11. An apparatus for casting concrete slabs comprising: molds for forming said slabs in successive superimposed layers; a car adapted to be supported by and to travel on said molds, and to distribute concrete therein; and means upon said car for laying material on each layer of slabs for separating said layer from the layer disposed immediately thereabove.

12. A method of molding slabs in superimposed horizontal layers separated by any suitable means, which comprises: positioning a series of vertically open molds upon a horizontal, flat surface; filling said molds and applying a separating means thereupon by the functioning of apparatus provided therefor upon a vehicle moving in definite relationship to the positioning of said slabs, and the repeating of said process in relation to successive series of superimposed molds.

13. Mechanism for molding slabs, ashlaring, tile, wall facings and like products of concrete or other suitable plastic material, in superimposed courses, combining: means for casting said products in superimposed courses and means for spreading upon each underlying course a separating medium against adhesion of said products.

14. A method of manufacturing slabs of plastic molding composition, which comprises: assembling in succession superimposed horizontal courses of vertically open molds and casting within said molds, as assembled, superimposed horizontal layers of said composition discharged from a moving vehicle through an automatically adjustable mouth member thereof, which maintains a close sliding fit with certain members pertaining to said molds thereby preventing the wasting of said composition.

15. In an apparatus for manufacturing slabs of plastic molding composition, the combination of: vertically open molds adapted to be assembled in superimposed horizontal courses; a vehicle adapted to move in definite relationship to said assembled molds and to discharge said molding composition into said molds; and an automatically adjustable vehicle mouth member, through which said discharge is accomplished, said mouth member being adapted to maintain a close sliding fit with certain members pertaining to said molds as assembled, thereby preventing wasting of said composition.

16. In apparatus for molding slabs, ashlaring, tile, wall facings and like products of concrete or other suitable plastic material, in superimposed courses, the combination of: molds and a molding car adapted to cast superimposed courses of plastic material products, to apply a parting medium between said courses and to spread a coating of oil or liquid solution or composition upon said molds and upon said parting medium and through said medium transmit a corresponding finish to contacting plastic composition.

17. A machine for molding one upon another suitable unit products such as slabs, ashlaring, tile, wall facings and the like, comprising: upwardly open, vertically expansible molding mechanism; and mechanism adapted to move horizontally back and forth over, and in substantially fluid tight connection with, and to periodically open into and charge said molding mechanism with concrete or other suitable plastic material, and in cooperation with other mechanism to cast within said molding mechanism, under confined pressure, in succession, unit products, the first product upon the bottom of said molding mechanism and succeeding products one upon the other, separated against adhesion with each other.

18. A machine for molding slabs, ashlaring, tile, wall facings and like products of concrete or other suitable plastic material, one above the other, combining: means for casting unit products, one above the other, and means for spreading a separating medium upon each underlying product.

19. A method of casting unit products, one upon another, comprising: confining a body of plastic material; moving said body back and forth over an open mold and thereby releasing and compressing the lower portion of said body into said mold and forming a product under fluid head pressure of the remainder of said body then confined thereto; continuing said movement and thereby severing said product from said body; expanding said mold vertically to form another mold at the top thereof; adding additional material to the top of said body to maintain compression; repeating said process and thereby forming successive superimposed products, one directly upon the other, until a stack of superimposed products of predetermined height is thus built up; and providing a separating medium between said products as so positioned.

20. A method of molding suitable products, one upon the other, which comprises: providing cooperating mechanism; confining any suitable plastic material; discharging said material downwardly under the fluid head pressure thereof; confining said discharge against waste of material and of compression; forming said material into unit products, one upon the other, while maintaining compression; and providing means of separating said products against adhesion with each other and performing said operations in whole or in part by said mechanism.

21. A method of molding slabs, ashlaring, tile, wall facings and like products of concrete or other suitable plastic material, comprising: confining plastic material and forming same under confined pressure into products, one above another, separated against adhesion, substantially without waste of material.

22. A method of curing plastic material products in stacks, comprising: forming stacks of unit products disposed one above the other in the manner indicated in claim 21; and curing said products while maintaining said position of said products relative to each other.

23. A method of molding, curing and handling plastic material products in stacks, comprising: forming stacks of unit products disposed one above the other in the manner indicated in claim 21; curing said products while maintaining said position of said products relative to each other; and handling said products as so positioned in stacks.

24. A method of manufacturing slabs in superimposed layers, separated as by paper, each slab having a body of one composition and a top finish of another composition, which comprises: positioning and filling, in succession, superimposed courses of vertically open molds with any suitable plastic molding composition discharged under pressure from a moving molding car through an automatically adjustable mouth member, which mouth member maintains a close sliding fit with certain members pertaining to said assembled molds, preventing the wasting of said composition, said car striking off excess material below the mold level and substituting finishing material under applied pressure, and applying to each course of molds as filled said parting medium as part of said operation.

25. Apparatus for molding slabs, ashlaring, tile, wall facings and like products of concrete or other suitable plastic material, combining; a course of stationary molds and a moving vehicle, said vehicle having different compartments for different materials, respectively, and adapted to spread cohesive layers of different materials within said molds and produce unit products each comprising layers of different materials, respectively.

26. In apparatus for molding slabs, ashlaring, tile, wall facings and other suitable products, each unit product comprising layers of different materials, the combination of: molds and moving mold-charging means; said means having separate compartments for different molding materials; said apparatus being adapted in cooperation to receive different suitable moldable materials and to confine and to mold same under pressure into said products, each unit product comprising cohesive layers of different materials.

27. Mechanism for molding, one upon another, slabs, ashlaring, tile, wall facings and other suitable products, each unit product comprising layers of different materials; said mechanism being adapted to receive and to separately confine different materials and to mold same under pressure into unit products, one upon another, each unit product comprising cohesive layers of different materials; said mechanism being further adapted to apply a separating medium upon each underlying unit product.

28. A method of molding different plastic materials into one product, comprising: compressing cohesive layers of different materials into one product and compressing thereupon another similar product and providing against adhesion of said products.

29. A method of manufacturing concrete products which consists in forming a mold comprising a plurality of individual molds placed end to end, placing a body of plastic material in substantially fluid tight communication with an endmost one of said individual molds, and moving said body of plastic material along said mold so as to fill said individual molds substantially without wastage of said plastic material.

30. A method of manufacturing concrete products which consists in forming a mold comprising a plurality of individual molds placed end to end, placing a body of plastic material in substantially fluid tight communication with an endmost one of said individual molds so that a stream of said material flows from said body into said mold and so that the static fluid pressure of said body, due to the weight thereof, is transmitted through said stream to the material already delivered to said mold, and moving said body of plastic material along said mold.

In testimony whereof, I have hereunto set my hand at Los Angeles, California, this 24th day of December, 1926.

ERNEST H. LOCKWOOD.